Nov. 5, 1940.   F. D. SWEENEY   2,220,133
FACEPLATE
Filed Jan. 16, 1939
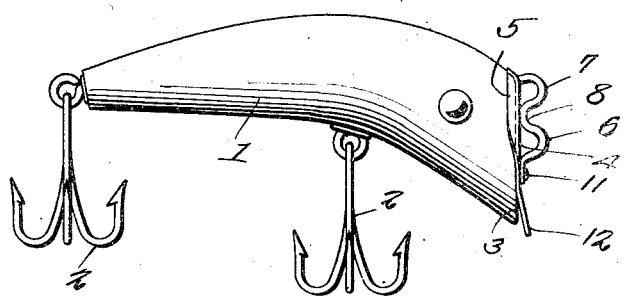
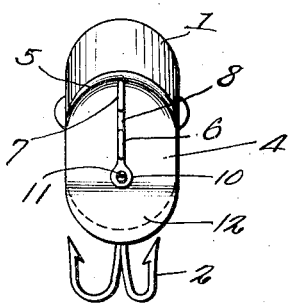
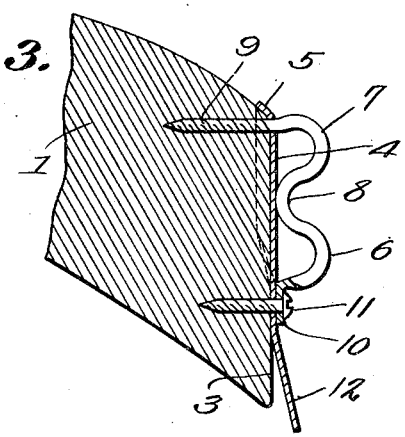
F. D. Sweeney
INVENTOR.
BY C. A. Snow & Co.
ATTORNEYS.

Patented Nov. 5, 1940

2,220,133

UNITED STATES PATENT OFFICE 2,220,133

FACEPLATE

Floyd D. Sweeney, Fresno, Calif.

Application January 16, 1939, Serial No. 251,221

2 Claims. (Cl. 43—46)

This invention aims to provide in a fishing lure, preferably but not necessarily of the form shown in my prior Patent No. 1,894,500, granted on January 17, 1933, a faceplate serving to protect the forward end of the lure from damage by contact with rocks, snags and the like, novel means being supplied for retaining the faceplate on the body of the lure, and the faceplate being so constructed that it can be adjusted readily to regulate the depth of travel of the lure, below the surface of the water.

Fig. 1 is a side elevation, Fig. 2 an end elevation, and Fig. 3 a longitudinal section wherein parts are broken away.

In carrying out the invention, there is provided a body 1, which is made of any buoyant material, such as wood, cork or the like. The body 1 is supplied with pivotally mounted hooks 2, disposed as occasion may require. The body 1 has a forward end surface 3, located about at right angles to the general direction of travel of the lure.

To the forward end surface 3 of the body of the lure is applied a face plate 4, made of copper or any composition which will be bendable, but still have such strength that it can be bent by an operator, but not by the water through which the lure passes. The upper portion of the face plate 4 is supplied with a rearwardly extended flange 5, fitting closely about the forward end of the body 1 and extended downwardly along the sides of the body, about half way, as clearly shown in Fig. 1 of the drawing.

On the forward end of the body 1 is mounted a line fastener, comprising outwardly projecting loops 6 and 7, connected by an intermediate loop 8. The loop 7 has a threaded end 9, and the loop 6 has a flattened foot 10, with a hole in it, the foot being disposed at an angle to the threaded end 9. The end 9 of the loop 7 is threaded through the faceplate 4, into the body 1, until the inwardly projecting loop 8 and the flattened foot 10 bear against the faceplate 4, and, then, a securing element 11, such as a screw, is passed through the foot and the faceplate 4, and into the body 1, to hold the line fastener and the faceplate in place.

It has been stated hereinbefore that the faceplate 4 is fashioned from bendable material, the lower end of the faceplate terminating in a downwardly extended and forwardly inclined tongue 12, arranged at an acute angle to the forward end surface 3 of the body 1.

Owing to the provision of the tongue 12, disposed as stated with respect to the end surface 3 of the body 1, the lure, when advanced, will travel below the surface of the water, and the distance between the lure and the surface of the water may be regulated, by bending the tongue 12 so that it assumes different angles relatively to the forward end surface 3 of the body 1.

The faceplate 4 gives stability to the lure and a more satisfactory operation, due to the provision of the adjustable tongue 12. The flange 5, partially surrounding the body 1, facilitates assembly, the cost of production being reduced. The faceplate 4, moreover, serves as a protection for the forward end of the body 1 and prevents damage to the lure, due to butting into rocks or other obstructions.

Having thus described the invention, what is claimed is:

1. A fishing lure comprising a body having a forward end surface, a faceplate, and means for securing the upper portion of the faceplate to the forward end surface of the body, the faceplate being supplied at its lower end with a downwardly extended tongue spaced from the forward end surface of the body, to define an angle with respect to the forward end surface of the body, the faceplate before being provided at its upper end with a rearwardly extended U-shaped flange receiving the forward portion of the body and terminating at places spaced from the upper extremity of the tongue, thereby leaving the tongue free for bendable adjustment, to vary said angle.

2. A faceplate for the forward end of a fishing lure, made of bendable metal, whereby an operator may fashion the lower end of the plate into a tongue, capable of assuming stable but adjusted angles with respect to the forward end surface of a lure, the upper portion of the plate having a U-shaped, rearwardly extended, lure-receiving flange, terminating short of the tongue, to permit the tongue to assume adjusted angles, as aforesaid.

FLOYD D. SWEENEY.